INVENTOR.
ROBERT C. RAETZ
BY Charles J. Ungemach
ATTORNEY

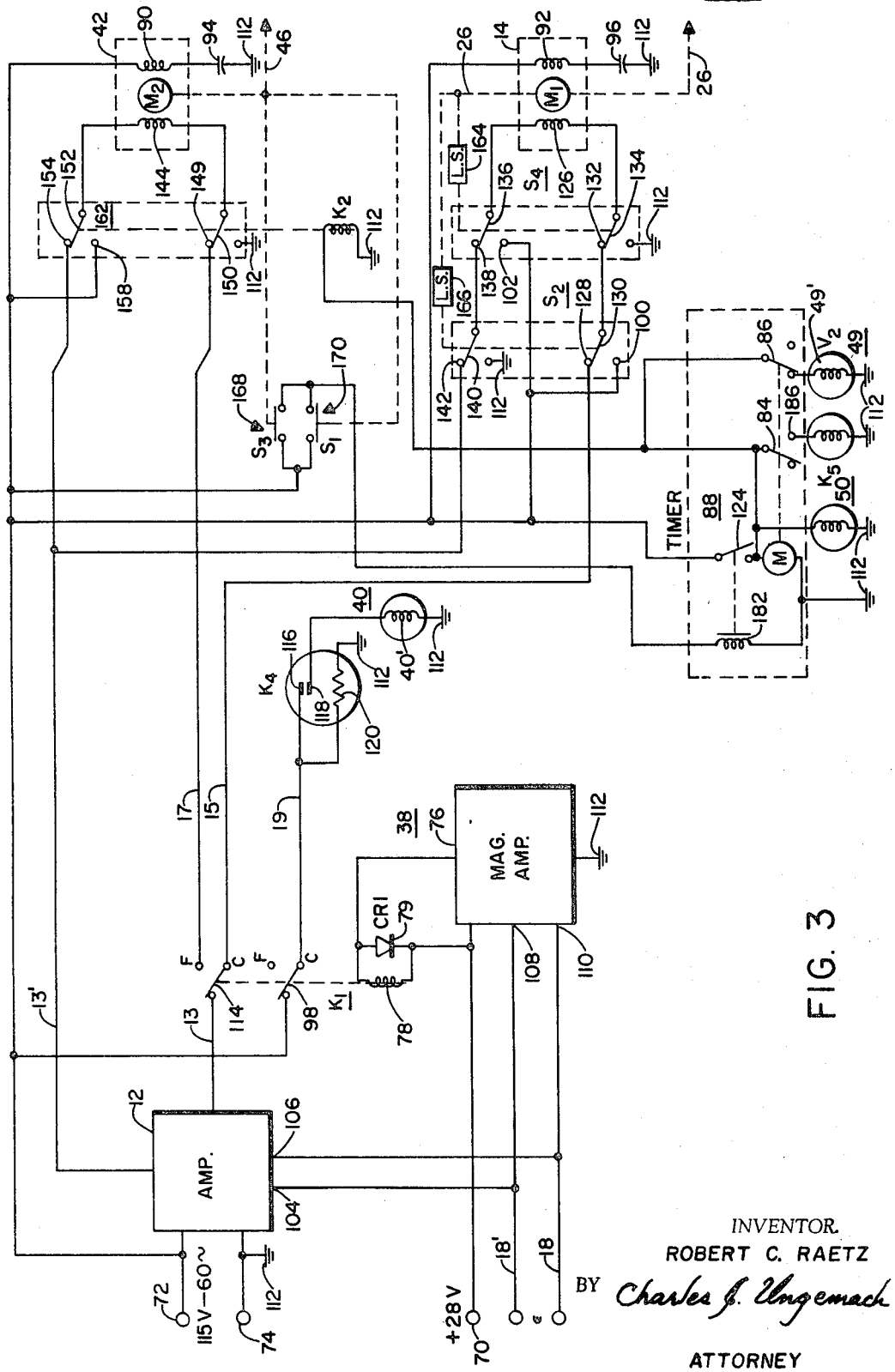

United States Patent Office 3,429,325
Patented Feb. 25, 1969

3,429,325
AUTOMATIC COARSE AND FINE PRESSURE CONTROL APPARATUS
Robert C. Raetz, Fridley, Minn., assignor to Honeywell Inc., Minneapolis, Minn., a corporation of Delaware
Filed Mar. 29, 1967, Ser. No. 626,748
U.S. Cl. 137—85     3 Claims
Int. Cl. F15b 5/00; G05d 16/20

ABSTRACT OF THE DISCLOSURE

Apparatus for producing an output pressure signal in response and proportional to an input signal, comprising a closed loop primary pressure source, which produces a relatively low resolution output, and a closed loop bellows unit connected to the low resolution output. After the low resolution output pressure signal reaches a predetermined level, the primary system is switched out, the bellows unit is switched in and a bellows in the unit is contracted (or expanded) until the pressure inside it reaches a second predetermined level which is of a relatively high resolution. The pressure within the bellows is the system output signal.

Background of the invention

In general the invention pertains to followup systems of motor control with plural paths of followup or feedback, the overall system being controlled by a self-balancing input device.

In particular the invention pertains to a servosystem which produces an accurate, variable pressure at its output. The variable output pressure is used to calibrate sensitive pressure responsive devices, for example, air data computers used aboard high speed aircraft. The system operates in two modes, a first or coarse mode and a second or fine mode.

In the prior art systems, as far as known, operation is only in the first or coarse mode and system resolution is relatively low. In a typical prior art system the motor is driven by the output signal of a pressure gage and controls a pressure-vacuum regulator. The pressure signal developed by the system is the output of the regulator. The output of the regulator is also fed back to the gage and algebraically summed with the gage input signal to null it. This eventually causes the gage output signal to be less than the threshold level of the system and it stops operating. The pressure at the output of the regulator then corresponds to the gage input signal. Pressure regulators in common use are relatively low resolution devices, i.e., they are not capable of producing smooth continuously variable output pressures. For example, commercially available pressure regulators produce an output pressure in the range 0–100 inches of mercury which is often only within 0.02–0.005 inch of mercury of the desired pressure. This is not nearly accurate enough for many purposes.

Summary

The invention comprises a servosystem having dual control loops. One loop controls the system when its error is relatively large whereas another loop controls the system when its error is relatively small. In this way a single control loop system having relatively low resolution can be upgraded to provide higher resolution by providing it with a second control loop. The range through which various components in the system can operate depends upon limit switches in the system. A timer unit is provided to protect a bellows unit in the system such that it is vented and disengaged whenever it reaches a predetermined expansion or contraction.

Description of the preferred embodiment

Figure 1:
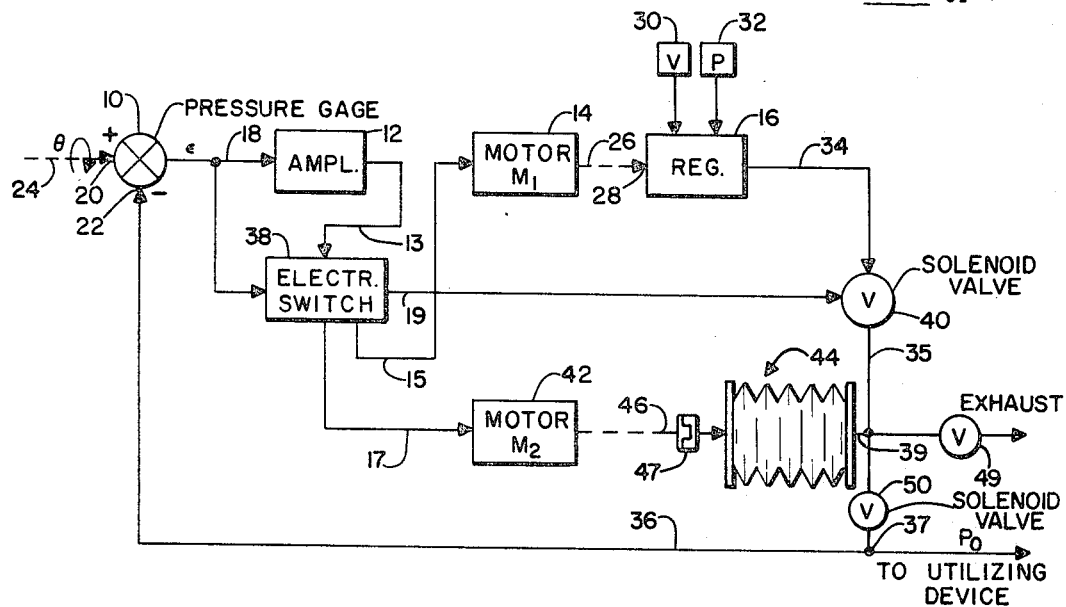
FIGURE 1 is a block diagram of the basic pressure system which is the subject of this application.

The main elements or components of the system of FIGURE 1 include a pressure gage 10, electronic amplifier 12, first motor 14 ($M_1$), regulator 16, switch means 38, solenoid valves 40, 49, and 50, second motor 42 ($M_2$) and bellows 44.

Pressure gage 10 has first and second input means 20 and 22. A shaft 24, shown as a dashed line, is connected to input means 20 and a conduit 36 is connected to input means 22.

The input signal to the system is the angular position or displacement $\theta$ of shaft 24. The angular position of shaft 24 is calibrated in terms of output pressure $P_o$ and the output signal of the system $P_o$ is a pressure which is a function of the angle $\theta$ of shaft 24. This function may be a linear one.

The signal $P_o$ present in conduit 36 and at second input means 22 is algebraically summed with the signal $\theta$ in gage 10. The output of gage 10, present on lead 18, is an electrical signal, designated $\epsilon$, corresponding to the algebraic sum of $\theta$ and $P_o$.

$$\epsilon = \theta + P_o$$

The signal $\epsilon$ is an algebraic sum, but the algebraic sum is the difference of $\theta$ and $P_o$ because the sign of $P_o$ is chosen opposite to that of $\theta$.

$$\epsilon = \theta + (-P_o)$$

In accordance with the terminology of servomechanisms, $\epsilon$ is the system error signal or the difference between the system input signal and the system output signal and gage 10 is a differential or error sensing, self-balancing device.

Gage 10 converts the pressure signal $P_o$ to an angular displacement signal, compares this signal with the angular displacement $\theta$ and generates an electrical signal which corresponds to the difference between $\theta$ and the converted $P_o$ signal.

The system error signal $\epsilon$ developed on lead 18 is impressed across the input means of amplifier 12. If the magnitude of $\epsilon$ is greater that the threshold level of amplifier 12, a constant 115 volt-60 cycle signal is developed on output lead 13. The phase of this signal is one of two phases and depends on the polarity or phase of the error signal $\epsilon$.

Switch means 38 has first and second input means. Leads 18 and 13 are connected to the first and second input means respectively. Note that lead 18 is common to the input of amplifier 12 and the first input means of switch 38. The purpose of switch 38 is to connect the signal present on lead 13 to either motor 14 or motor 42 depending on the magnitude of ε. If the magnitude of ε is relatively large, switch 38 acts to switch the signal on lead 13 to output lead 15 thereby applying a 115 volt-60 cycle signal to motor 14. If, however, the magnitude of ε is relatively small, switch 38 acts to switch the signal on lead 13 to output lead 17 thereby applying a 115 volt-60 cycle signal to motor 42. Swith 38, therefore, functions to cause either motor 14 or motor 42 to be energized by the signal on lead 13 depending on whether the magnitude of ε is relatively large or small. This is assuming, of course, that ε exceeds the threshold level of amplifier 12 because if it does not there is no signal developed on lead 13. In addition to output leads 15 and 17, switch 38 has a third output lead 19 associated with it. When the magnitude of ε is relatively large an electrical signal is developed on lead 19 which energizes solenoid valve 40. Energizing valve 40 switches it, causing a pressure signal normally present in a conduit 34 connected to the top of valve 40 to be applied to a conduit 35 connected to the bottom of valve 40.

Motors 14 and 42 are two phase induction servomotors and are substantially identical. Motors 14 and 42 have rotating output shafts 26 and 46 respectively. Gear trains (not shown) are associated or included with shafts 26 and 46. Motors 14 and 42 differ only with respect to their revolutions per unit time. The effective rate of rotation of motor 14 is greater than that of motor 42.

Shaft 26 is connected to input means 28 of pressure regulator 16. Regulator 16 is also connected to a source of constant vacuum 30 (V) and a source of constant pressure 32 (P). Regulator 16 is a mechanical device which develops an output pressure in conduit 34 which varies in the range of pressures defined by sources 32 and 30 (P–V) depending on the angular displacement of shaft 26. Regulator 16 operates by a bleeding process. A pressure differential is created by flow between pressure source 32 and vacuum source 30. By means of a needle valve or other pressure restrictor (not shown) the desired output pressure is bled or tapped off the pressure differential set up between sources 32 and 30.

Shaft 46 is connected to bellows 44 through a clutch 47 which is normally engaged. Rotation of shaft 46 causes the volume of bellows 44 to be varied. In operation, this change of volume is effective in changing or varying the pressure inside bellows 44 and consequently changing the pressure in conduits 35 and 36 which communicate directly with the interior of the bellows.

The output conduit 34 of regulator 16 is connected to the top of solenoid valve 40. Conduit 35 is connected to the bottom of valve 40 and is connected to bellows 44, the left side of solenoid valve 49, and the top of solenoid valve 50. The bottom of solenoid valve 50 is joined to conduit 36 at a junction 37. The system output pressure $P_o$ is available at junction 37.

The general system operation will be described with reference to FIGURE 1. Assume that $\theta$, the output of regulator 16, and $P_o$ are initially zero. Therefore ε is essentially zero, switch 38 is de-energized, and the output of amplifier 12 is zero. Motors 14 and 42 are not energized and solenoid valve 40 is closed thereby disconnecting conduits 34 and 35. Solenoid valve 50 is open thereby connecting, or coupling, bellows 44 to conduit 36. Also assume that bellows 44 is physically biased such that when $P_o$ equals zero it is contracted a predetermined amount.

System operation begins when a relatively large input signal $\theta$ is supplied to it by rotating shaft 24. The system does not respond immediately so $P_o$ remains substantially zero and ε is relatively large and equivalent to $\theta$ during the initial phase of operation. Since ε is relatively large, amplifier 12 develops a 115 volt signal on lead 13. Switch 38 is also responsive to the relatively large ε and it gates or switches the 115 volt signal on lead 13 to lead 15 which is connected to motor 14. Motor 14 begins rotating, driving regulator 16 and causing it to develop a pressure signal in conduit 34. Switch 38 also switches the 115 volt signal to lead 19 and valve 40 and holds it open, enabling the signal in conduit 34 to be applied to conduit 35, bellows 44 and through valve 50 to conduit 36. Conduit 36 returns this signal to input means 22 of gage 10.

This action continues until the pressure in conduit 36 approaches $\theta$, the input signal to the system. The error signal ε becomes relatively small causing switch 38 to gate the signal on lead 13 to lead 17. In this way driving voltage is removed from motor 14 and applied to motor 42. Simultaneously, switch 38 generates a signal on lead 19 which closes valve 40. Motor 42 rotates and drives bellows 44 causing it to contract. The contraction of bellows 44 increases its interior pressure and consequently the pressure in conduits 35 and 36 also increases until $P_o$ is equal to $\theta$ and the system stops operating. In essence the system comprises dual servo loops; one controls the system in a coarse mode of operation and the other in a fine mode.

Figure 2:
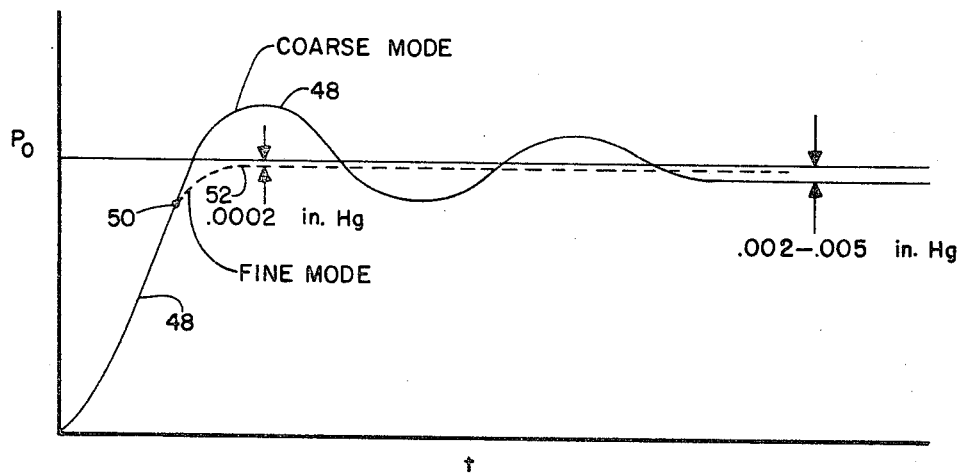
FIGURE 2 is a graph of output pressure $P_o$ as a function of time $t$. The graph illustrates how the response of the system which is disclosed in this application differs from other systems which are known; and, FIGURE 3 is a schematic diagram of the control circuitry of the basic system of FIGURE 1.

Curve 48 in the graph of FIGURE 2 describes the system operation in the coarse mode alone. This operation is common in the known systems. The output signal overshoots, oscillates and reaches a final value which is quite far from the desired value of $P_o$. In fact it may be anywhere from 0.002–0.005 in. Hg away from the desired value.

The operation of the improved system is also defined by curve 48 in the region between the origin of the graph and the point 50 on curve 48. At point 50 the system switches to its fine mode of operation, as shown by dashed line 52, and the system output pressure is brought up to a point very close to the desired value, for example to within 0.0002 in. Hg.

The portion of the system of FIGURE 1 comprising amplifier 12, switch 38, motor 14 and motor 42 is shown in more detail in FIGURE 3.

Referring to FIGURE 3, the system is supplied with +28 D-C volts from a terminal 70 and with 115 volts-60 cycle from a pair of terminals 72 and 74. The 28 volts is supplied to a magnetic amplifier 76 and to the bottom end of a winding 68 of a relay $K_1$. The 115 A-C voltage is supplied directly to amplifier 12, a main winding 90 of motor 42 and a main winding 92 of motor 14. Windings 90 and 92 are connected in series with phase shifting capacitors 94 and 96, respectively. One side of the 115 A-C voltage, i.e., that at terminal 72, is connected to various terminals, contacts and contactors throughout the system. It is connected to a contactor 98 of relay $K_1$, to a contact 100 of a switch $S_2$, to a contact 102 of a switch $S_4$, to a contactor 124 in a timer unit 88, to limit switches 168 ($S_3$) and 170 ($S_1$), and to a contact 158 of a switch 162.

FIGURE 3 shows the system in the coarse mode of operation. The error signal ε is relatively large and is developed across leads 18 and 18'. It is impressed across input terminals 104 and 106 of amplifier 12 and input terminals 108 and 110 of magnetic amplifier 76. Amplifier 76. Amplifier 12 develops 115 volts A-C across output leads 13 and 13' and magnetic amplifier 76 operates to effectvely connect the upper end of winding 78 to ground 112 which causes +28 volts D-C to be applied across winding 68 of relay $K_1$, energizing it. Contactor 98 and a contactor 114 are pulled downward and remain in that position during the time that winding 78 is energized. A diode 79 is connected across winding 78 to prevent the buildup of the inductive voltage across the winding when it is de-energized.

When contactor 98 is pulled downward, 115 volts A-C is supplied to a heater element 120 of a thermal time-deyaly relay $K_4$. The heat generated by element 120 causes a pair of bimetal strips 116 and 118 to bend and make contact, thereby applying 115 volts A-C across a solenoid winding 40' of valve 40, causing it to be opened. In this way the opening of valve 40 in going from the fine mode to the coarse mode of operation is delayed while strips 116 and 118 are heating. Therefore the output pressure of regulator 16 changes a small amount before the valve 40 is opened in switching from the fine mode of operation to the coarse mode. This is to prevent a momentary negative going output signal $P_o$ when the input signal $\theta$ to gage 10 is increased and to prevent momentary positive going signals when $\theta$ is decreased. Note that in the fine mode of operation the output pressure in conduits 35 and 36 is not the same as that in conduit 34. In FIGURE 2 for example the pressure in conduit 35 is represented by the dashed line and represents a value quite close to $P_o$. On the other hand the pressure in conduit 34 is equivalent to that at point 50 where switching from the coarse mode to the fine mode occurred. Thus if valve 40 is to be opened in switching from the fine mode back to the coarse mode regulator 16 must be given time to increase its output pressure before conduits 35 and 34 are connected. Otherwise the pressure in conduit 35 experiences a momentary relatively sharp drop (or increase as the case may be) when the mode of operation is changed from fine to coarse when an increased output pressure has been commanded.

When contactor 114 in relay $K_1$ is pulled down the voltage present on lead 13 is applied to lead 15 and an auxiliary winding 126 of motor 14 is energized thereby driving shaft 26 of motor 14. The path of the current energizing winding 126 comprises lead 13, contactor 114, lead 15, a contact 128 of a switch $S_2$, a contactor 130 of switch $S_2$, a contact 132 of a switch $S_4$, a contactor 134 of switch $S_4$, winding 126, a contactor 136 and a contact 138 of switch $S_4$, a contactor 140 and a contact 142 of switch $S_2$ and lead 13'. The output signal of amplifier 12 is developed across leads 13 and 13' and in this way motor 14 is energized in the coarse mode of operation and its shaft 26 drives regulator 16, increasing or decreasing the output pressure of regulator 16 in conduit 34 depending upon the pressure called for or commanded by the input signal $\theta$.

In much the same way, an auxiliary winding 144 of motor 42 is energized when relay $K_1$ is not energized and contactor 114 is up rather than down. The series current path for winding 144 consists of a lead 13, contactor 114, lead 17, a contact 149 and a contactor 150 of a switch 162, winding 144, a contactor 152 and a contact 154 of switch 162, and lead 13'. The 115 volts A-C output of amplifier 12 is developed across leads 13 and 13'. In this way motor 42 is energized thereby causing its shaft 46 to drive bellows 44.

Limit switches 164 and 166, connected to shaft 26 of motor 14, fix or limit the range through which regulator 16 is driven by shaft 26 of motor 14. At the upper limit, switch 164 is tripped by shaft 26, pushing contactors 136 and 134 downward into contact with contact 102 and ground 112 respectively. This grounds the bottom end of winding 126 and returns the top end to terminal 72 of the 115 volt A-C supply, causing motor 14 to reverse its direction when the limit is reached. In the same way at the lower limit, switch 166 is tripped by shaft 26, pushing contactors 140 and 130 downward until they contact ground 112 and contact 100, respectively. Thus the top end of winding 126 is grounded and the bottom end is returned to 115 volts A-C, causing motor 14 to reverse its direction when the lower limit is reached.

The travel of bellows 44 must also be limited or kept within a predetermined range. Limit switches 168 and 170 are tripped by shaft 46. At the upper limit of travel switch 168 is tripped, actuating timer 88. Timer 88 controls the venting, disengaging, and re-engaging of bellows 44. The tripping of switch 168 impresses 115 volts A-C across a coil 182 and the magnetic field built up in coil 182 pulls in contactor 124 thereby impressing 115 volts A-C across a motor 184, valve 50, contacts 84 and 86, and relay $K_2$. Valve 50 closes and disconnects conduit 35 from 36. Motor 184 pushes contactors 84 and 86 to the right. Moving contactor 86 to the right removes 115 volts A-C from and de-energizes a solenoid winding 49' of a valve 49. This causes valve 49 to open, venting bellows 44 to the atmosphere. A short time later contactor 84 makes with a contact 186 which causes 115 volts A-C to be applied across the winding of solenoid $K_5$. This causes a clutch 47 (see FIGURE 1) connecting shaft 46 of motor 42 to bellows 44 to disengage and bellows 44 springs back to its neutral or free position. The energization of relay $K_2$ during the operation of timer 88 causes motor 42 to rotate, insuring proper re-engagement of bellows 44 with shaft 46 and clutch 47. After a predetermined time solenoid $K_5$ de-energizes, valve 49 closes, valve 50 opens and contactor 124 opens removing 115 volts A-C power from timer 88. At the lower limit of travel switch 170 is tripped and the above sequence is repeated.

The invention has been described with reference to a specific embodiment. The invention is not to be limited to this description but rather to the following claims.

I claim:

1. In a controller system of the class comprising a gage, a power amplifier, a servomotor, and a regulator which is capable of only relatively low accuracy, wherein the gage develops an error signal which is the algebraic sum of a first and second input signal thereto, the first signal corresponds to a predetermined system input signal, the error signal power is increased by said amplifier and energizes the motor mechanically coupled to and controlling said regulator, the regulator develops an output signal in accordance with the first input signal and the output signal is fed back to said gage through a conducting means and serves as the second input signal, and the system operates to effectively reduce the algebraic sum of the first and second input signals to a null level, the improvement comprising:

a switch operatively associated with said amplifier;
a second servomotor;
a valve; and,
a second regulator, the second regulator connected to the feedback conducting means and capable of relatively high accuracy, the valve, which has a normal condition, also connected to the feedback conducting means and normally operating to apply the output of the low resolution regulator to the input of the high resolution regulator, the second motor operatively associated with the second regulator, the switch operating to detect when the system error signals is less than a predetermined absolute amount and thereafter operating to disconnect the low resolution regulator controlling motor from said amplifier, connect the second motor to said amplifier, and change the condition of said valve from its normal condition to thereby isolate the output of the low resolution regulator from the input of the high resolution regulator.

2. In a pressure controller system of the class comprising a gage, a power amplifier, a servomotor, and a regulator which is capable of only relatively low accuracy, wherein the gage develops an electrical error signal which is the algebraic sum of a first and second input signal thereto, the first signal corresponds to a predetermined pressure, the error signal power is increased by said amplifier and drives the motor which is mechanically coupled to and controls said regulator, whereby the regulator develops an output pressure in accordance with the first input signal, the output pressure is fed back to said gage through a tube and serves as a second input signal, and the system operates to effectively reduce the algebraic sum of the first and second input signals to a null level, the improvement comprising:

an electronic switch operatively associated with said amplifier, a second servomotor, a solenoid valve, and a bellows, the bellows connected in the feedback tube and capable of relatively high accuracy, the solenoid valve, which is normally open, also connected in the feedback tube and located between said bellows and said regulator, the second motor operatively associated with said bellows, the electronic switch operating to detect when the system error signal is less than a predetermined absolute amount and thereafter operating to disconnect the low resolution regulator motor from said amplifier, connect the second motor to said amplifier, and close said normally open solenoid valve.

3. The apparatus of claim 2 wherein the bellows is automatically removed from the output pressure, vented, and disengaged from the second motor when it reaches a predetermined expansion due to the output pressure of the regulator.

References Cited

UNITED STATES PATENTS

| | | | |
|---|---|---|---|
| 3,079,540 | 2/1963 | Fillmore | 91—363 X |
| 3,315,250 | 4/1967 | Higgins | 137—85 X |

ALAN COHAN, *Primary Examiner.*

U.S. Cl. X.R.

60—10.5; 91—6